O. F. KADOW.
WATER METER.
APPLICATION FILED JUNE 17, 1907.
958,408.
Patented May 17, 1910.
2 SHEETS—SHEET 1.
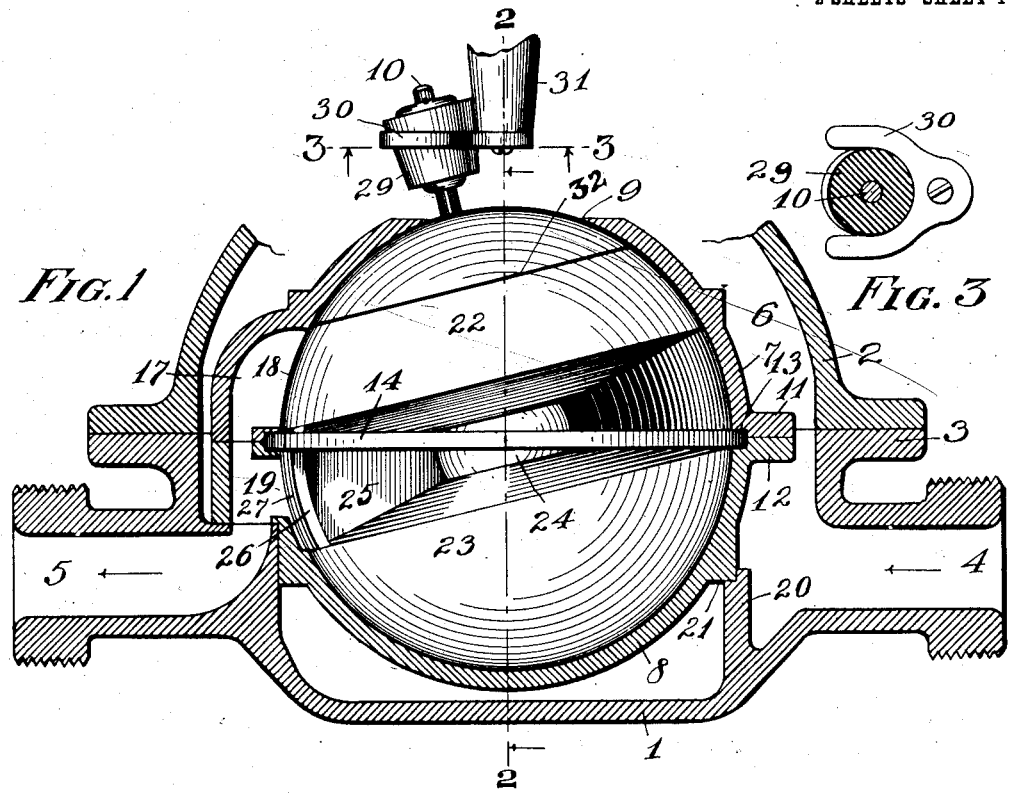

O. F. KADOW.
WATER METER.
APPLICATION FILED JUNE 17, 1907.
958,408.
Patented May 17, 1910.
2 SHEETS—SHEET 2.
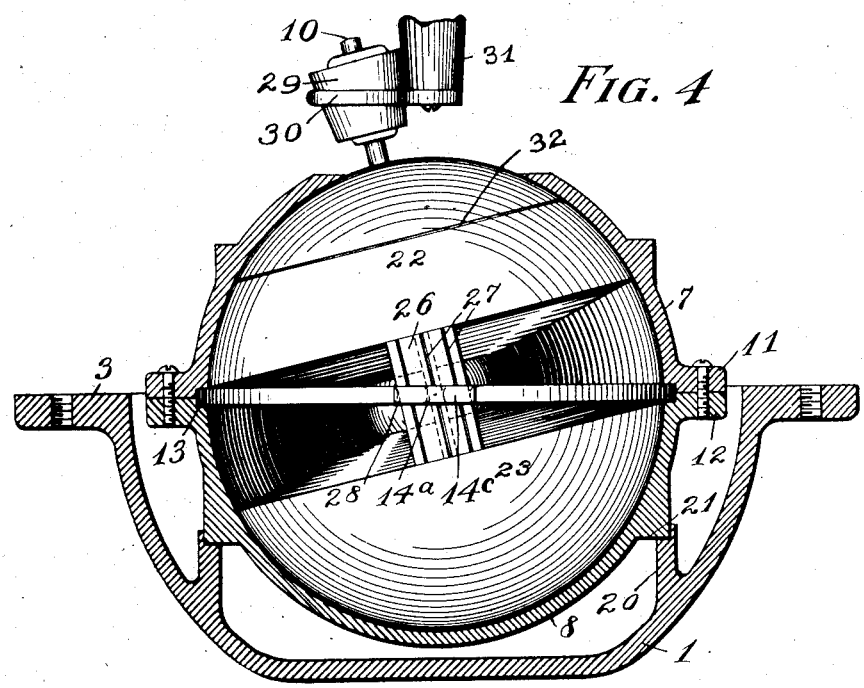
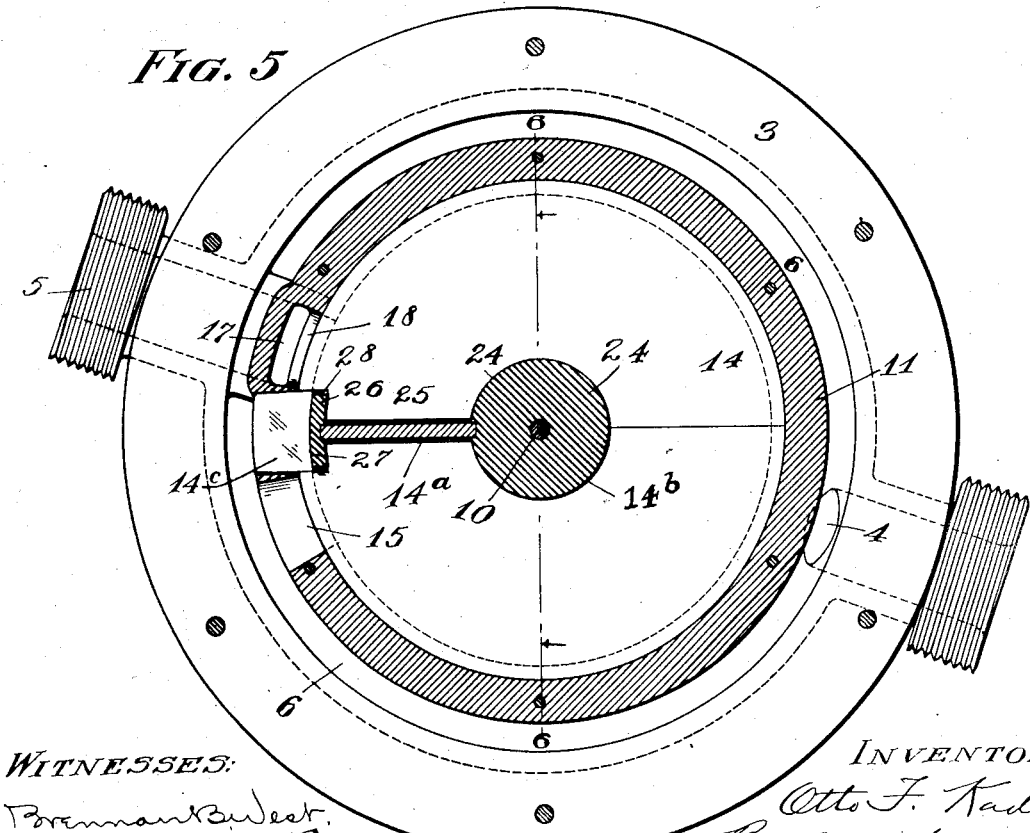
WITNESSES:
Brennan B. West
Nathan F. Fretter
INVENTOR,
Otto F. Kadow
By Bates, Fouts & Hull,
ATTYS.

UNITED STATES PATENT OFFICE.

OTTO F. KADOW, OF CLEVELAND, OHIO.

WATER-METER.

958,408.　　　　Specification of Letters Patent.　　Patented May 17, 1910.

Application filed June 17, 1907. Serial No. 379,329.

*To all whom it may concern:*

Be it known that I, OTTO F. KADOW, a citizen of the United States, residing at Cleveland, in the county of Cuyahoga and State of Ohio, have invented a certain new and useful Improvement in Water-Meters, of which the following is a full, clear, and exact description, reference being had to the accompanying drawings.

This invention relates to fluid meters of the wabbling piston type, and has for its objects to produce a meter of this type which will operate with practically no friction and which will be durable, noiseless and accurate in operation. While meters of this general type have long been in use, they are subject to a number of disadvantages. All of the meters of this type with which I am familiar are provided with a disk or diaphragm of hard rubber, and this is liable to warpage and requires frequent replacement. Furthermore, the meters of this type with which I am familiar are liable to leakage, which will result in rendering the meters inaccurate and will prevent them from recording the passage of very small streams of fluid therethrough. A further objection to meters of this type with which I am familiar is the fact that they are liable to produce a chattering noise while in operation. A still further objection to the aforesaid meters is the existence of friction, which renders the same uncertain and inaccurate in operation.

It is the object of this invention to provide a meter free from the above objections and one which shall be simple, practical, substantial and well adapted for all the exigencies of use. I accomplish these results by the construction shown in the drawings forming a part hereof, wherein—

Figure 1 represents a central sectional view showing a meter constructed in accordance with my invention, the spherical piston and the diaphragm being shown in elevation and a portion of the outer casing being broken away. Fig. 2 represents a similar view on line 2—2 of Fig. 1. Fig. 3 represents a sectional view on line 3—3 of Fig. 1. Fig. 4 represents a view similar to Fig. 2 looking in the opposite direction. Fig. 5 represents a sectional view through the center of the spherical piston, the disk being shown in elevation, and Fig. 6 represents a sectional view of the diaphragm corresponding to line 6—6 Fig. 5.

Describing the parts by reference characters, 1 and 2 represent, respectively, the upper and lower sections of the meter casing, said sections being made separable and connected together through flanges 3. Section 1 is provided with an inlet connection 4 and an outlet connection 5, located on diametrically opposite sides of said casing. Inlet 4 communicates with the chamber 6 formed between the meter casing and the cylinder. This cylinder is provided with a spherical chamber and comprises an upper section 7 and a lower section 8, the upper section being provided with a circular opening 9 through which projects the axis or pin 10 carried by the piston. The cylinder sections are connected together by means of flanges 11 and 12 extending circumferentially around the same and provided each at its inner surface with a fractional recess 13 said recesses forming together a complete recess for the reception of the periphery of the disk 14.

Nearly opposite the inlet connection 4, cylinder section 7 is provided with a pair of inlet ports 15 and 16 located respectively above and below the disk 14 and is also provided, beyond said ports, with a chamber 17 provided with outlet ports 18 and 19 above and below said disk, respectively, and communicating with the outlet connection 5. These ports, as will appear more particularly from an inspection of Fig. 2, are generally triangular in outline. The lower edge of each port, which corresponds to the base of the triangle, diverges from the diaphragm 14 in a direction extending from the corner of the port which is nearest to the division plate, which will be hereinafter described.

The lower cylinder section 8 is supported on an upstanding flange or partition 20 extending nearly around the casing, as far as outlet connection 5, where it extends upwardly somewhat to form part of the passageway between said connection and chamber 17, the lower section 8 being provided with an annular rib 21 resting on said partition.

Sections 7 and 8 are generally hemispherical in shape to form a bearing between the inner surface thereof and the outer surface of the piston, which is generally spherical in shape. The piston comprises an upper sector-shaped section 22 and a lower sector-shaped section 23 joined at their central portions by means of a small spherical section 24 and the pin 10, uniting said sections and passing through said ball.

Sections 22 and 23 are of such shape as to constitute in effect a sphere having a central zone thereof removed. The lower surface of 22 and the upper surface of 23 are inclined toward the center of the sphere, the angle made by the inclined surfaces with respect to a plane passing through the outer periphery of each being equal to the angle of inclination of the pin or axis 10 with respect to the axis of nutation of the sphere. The purpose of so inclining the upper and lower surfaces of 22 and 23 will be explained hereinafter. The spherical section or ball 24 extends through a central aperture in the disk 14 and forms a close fit therewith.

25 denotes a division plate which spans the gap between the sections 22 and 23, the inner edge of said division plate being supported within a recess in the ball 24 and the outer edge of said plate being provided with a flange 26, so that the said plate is substantially T-shaped in section, the outer edge of the flange being curved to correspond to the curvature of the sphere of which 22 and 23 are sections and constituting in effect a continuous connection therebetween and being provided with a plurality of vertically extending grooves 27. Disk 14 is provided with a slot 14ª for the reception of division plate 25, the sides of said slot being rounded, as shown in dotted lines in Fig. 4, to permit of the rocking or oscillation of the division plate in said slot and at the same time reduce the leakage of fluid therethrough. The outer edge of the disk 14 is provided with a correspondingly-shaped slot 28 for the flange 27, this slot being also rounded to form a close joint between the flange and the disk, irrespective of the oscillation of the flange in said slot. The disk 14 is of metal, preferably brass, while the spherical sections 22 and 23 and the spherical connection or ball 24 are of hard rubber. The division plate is preferably made in two parts, the web being preferably of brass and the flange of rubber. By making the disk 14 of brass, I avoid the liability to warp which is inherent with disks heretofore used in meters of this type. Another important advantage is that access of warm water to the interior of the meter casing will not cause such distortion of the parts as will render the meter inaccurate or inoperative.

As will appear from Figs. 2, 5 and 6, the diaphragm 14 is made in two sections, in order that the wall of the aperture 14ᵇ therethrough may be rounded to conform to the curvature of the spherical ball or connection 24. By making the diaphragm of two parts, access may be had to the fractional aperture in each part thereof to give a spherical contour to the wall of said aperture. It is important that the aperture should conform to the surface of the connection 24, otherwise there would be only a line contact between the diaphragm and the connection, which is liable to wear and permit the piston to sag toward the cylinder wall, thereby producing friction, which will interfere with the accuracy of the meter. It will be noted further that the flange 26 forms in effect a continuation of the outer spherical surface of sections 22 and 23. In the commercial manufacture of the diaphragm, a recess will be left in the outer rim of the diaphragm immediately opposite the said flange. I close this recess by means of a curved plate or filling piece 14ᶜ. (See Figs. 4 and 5.) This extends outwardly as far as the outer edges of flanges 11 and 12 and locks the division wall in position and prevents leakage and short-circuiting between the inlet and outlet ports.

The upper end of pin 10 is provided with a cone 29 fitting within a U-shaped strap 30 mounted on the lower end of the register shaft 31, by means of which the wabbling of the piston is converted into a rotary movement for operating the registering mechanism of the meter, such mechanism being well known in the art and in its details forming no part of my invention.

In operation, fluid entering connection 4 passes upwardly into the space 6 within the upper casing section 2 and thence through one of the inlet ports 15 or 16 into the space between the adjacent portion of the spherical piston and the disk 14, the pressure of the fluid against the adjacent surface of the piston causing the same to wabble about its center and, owing to the inclination of the sphere and the angle at which the lower and upper surfaces of sections 22 and 23 are beveled, these surfaces will roll upon the disk 14 and, as they roll, they will conform more closely to the surfaces of disk 14 with which they respectively engage, forming in effect a ground joint therewith and thereby overcoming any leakage that may exist in the initial operation of the meter and preventing any subsequent leakage. With this construction, the longer the meter operates the more perfect will be its operation.

It will be apparent, particularly from Fig. 2, that the lower edge of port 15 and the upper edge of port 16 diverge outwardly from the inner corners thereof with respect to the diaphragm 14 and that said edges are remote from said diaphragm. The inclination of these edges corresponds substantially to the curvature of the lower and upper edges of the sections 22 and 23, respectively, when said edges are in contact with that portion of the diaphragm which is adjacent to the ports, the inclination of the axis of the sphere causing the lower and upper edges of said sections to curve in opposite directions from the point of contact with said diaphragm. It will also be noted that the outlet ports 18 and 19 are of the same shape as the inlet ports 15 and 16. This construction insures a complete closing of one set of ports when the other is completely open and prevents any short-circuiting between the inlet ports, which would destroy the reliability of the meter. When the spherical piston has been rolled or wabbled sufficiently by the fluid admitted through one inlet port, the other inlet port will be opened and water will flow on opposite sides of the diaphragm, whereby the pressure above and below said diaphragm is equalized and, owing to this fact and to the employment of the spherical form of piston and the bearing formed between the same and its casing, the friction offered by the meter to the flow of the fluid therethrough is practically negligible. It will be seen that the upper section 22 is provided with a groove 32 for the purpose of preventing leakage between the same and the adjacent surface of cylinder section 7.

Owing to the construction of the division plate 25, no resistance is opposed by the disk 14 to the movement of said division plate therethrough, and the meter works without the noise or chattering which is common with other meters of this type with which I am familiar. Furthermore, the provision of the wide flange 26 at the end of division plate 25 and the employment of the longitudinal grooves 27 therein effectively prevent any short-circuiting between the inlet and outlet ports while at the same time preventing friction between said division plate and the disk 14. As a result, with my meter I am able to record the flow of very small streams of fluid therethrough, even of streams below 1/64" in diameter.

While my meter will generally be used for measuring the flow of water, it is evident that it is adaptable for use with other fluids.

Having thus described my invention, I claim:

1. A meter comprising a spherical piston having at the central portion thereof a recess, a disk in said recess, means for wabbling said piston, and a division plate spanning said recess and extending through said disk, the piston having at the central portion of said recess a spherical bearing fitting in an aperture in said disk, substantially as specified.

2. A meter comprising in combination, a cylinder casing, a spherical piston mounted therein and having a central recess, a central spherical connection in said recess, a diaphragm supported by said casing and located within said recess, and a division plate spanning said recess and extending from said spherical connection to the outer periphery of said recess and extending through a slot in said diaphragm, the edges of said slot being rounded, said casing being provided with an inlet and an outlet port located on opposite sides of said division plate, substantially as specified.

3. A meter comprising in combination, a cylinder casing, a piston mounted therein and having a central recess, a central connecting member in said recess, a diaphragm located within said recess, and a division plate spanning said recess and extending from said member to the outer periphery of said recess and extending through a slot in said diaphragm, the edges of said slot being rounded, said casing being provided with an inlet and an outlet port located on opposite sides of said division plate, substantially as specified.

4. In a meter, the combination of a cylinder casing, a spherical piston therein having a central recess, a fixed diaphragm in said recess and having a central aperture, said piston being provided with a central spherical section fitting the said aperture, the axis of said piston being at an angle with respect to the axis of said casing, the upper and lower walls of said recess being inclined from the outer portion thereof toward the center of the recess, the inclination of said walls providing a rolling contact between the same and the disk, a division plate spanning the recess and extending through a slot in said diaphragm, and said casing having inlet and outlet ports located on opposite sides of said division plate, substantially as specified.

5. In a meter, the combination of a metallic cylinder casing, a spherical piston therein of hard rubber, said piston having a central recess and a spherical bearing at the central portion of said recess, a metallic diaphragm mounted in said recess and having an aperture fitting said spherical bearing, and a division plate spanning said space and extending from said bearing outwardly to the periphery of said recess, said division plate being of hard rubber and said casing having an inlet and an outlet port located on opposite sides of said division plate, substantially as specified.

6. In a meter, the combination of a casing, a piston therein comprising an upper and a lower section spaced apart to provide a recess and have a connecting member provided with a convex surface, a diaphragm supported in said recess and having a central aperture for said connection, a division plate spanning said recess from top to bottom thereof and extending from the connecting member to the outer periphery of said recess and extending through a slot in said diaphragm, said casing having an inlet and an outlet port located on opposite sides of the division plate, substantially as specified.

7. In a meter, the combination of a cylinder casing, a wabbling piston therein, said piston comprising two members spaced apart to provide a central recess therebetween and having a central connection, a diaphragm in said recess, a division plate extending across said recess and uniting said members, said division plate extending through a slot in said diaphragm, said casing being provided with an inlet port at one side of said division plate and at one side of said diaphragm, said port having an edge thereof adjacent to said diaphragm and diverging therefrom as its distance from said division plate increases, substantially as specified.

8. In a meter, the combination of a cylinder casing, a wabbling piston therein, said piston comprising an upper and a lower member having a recess therebetween and a central connecting portion, a diaphragm in said recess having a central aperture for such connection, a division plate connecting said piston members and extending through a slot in said diaphragm, said casing having a pair of inlet ports, one above and the other below said diaphragm and adjacent to said division plate, each of said ports being generally triangular in shape with the apex of the triangle remote from said diaphragm and the edge of the port formed by the base of the triangle diverging from the diaphragm as said edge recedes from the division plate, substantially as specified.

9. In a meter, the combination of a spherical casing, a wabbling piston in said casing comprising an upper and a lower spherical sector-shaped member spaced apart to form a recess therebetween, a central connecting member for said sections, a diaphragm in said recess having a central aperture for the reception of said connecting member and a slot extending outwardly from said member, a division plate extending across said recess between the upper and the lower spherical members, said casing having an inlet port and an outlet port therein on opposite sides of said division plate, said ports being generally triangular in shape, with the bases of the triangles adjacent to but spaced from the diaphragm and diverging therefrom as the distance of the bases from the division plate increases, substantially as specified.

10. In a meter, the combination of a cylinder casing, a wabbling piston therein, said piston comprising a pair of members having a recess therebetween and a central connecting portion, a diaphragm in said recess having a central aperture for such connection, a division plate connecting said piston members and extending through a slot in said diaphragm, said casing having an inlet port at one side of said diaphragm and adjacent to said division plate, said port being generally triangular in shape with the apex of the triangle remote from said diaphragm and the edge of the port formed by the base of the triangle diverging from the diaphragm as it recedes from the division plate, substantially as specified.

11. In a meter, the combination of a spherical casing, a wabbling piston in said casing comprising an upper and a lower spherical sector-shaped member spaced apart to form a zone-shaped recess therebetween, a central spherical connecting member for said sections, a diaphragm in said recess and having a central aperture for the reception of said connecting member and a slot extending outwardly from said members, a division plate extending across said recess between the upper and the lower spherical members, said casing having a pair of inlet ports and a pair of outlet ports therein the inlet ports being on opposite sides of said diaphragm and on the same side of the division plate and the outlet ports being on opposite sides of the diaphragm and on the opposite side of the division plate from the inlet ports, said ports being generally triangular in shape, with the bases of the triangles adjacent to but spaced from the diaphragm and diverging therefrom as the distance of the bases from the division plate increases, substantially as specified.

12. In a meter, the combination of a cylinder casing, a wabbling piston therein having a central recess, a diaphragm in said recess, a division plate spanning said recess and having a flanged outer face, the casing being provided with an inlet port and an outlet port located on opposite sides of said face, substantially as specified.

13. In a meter, the combination of a cylinder casing, a wabbling piston therein having a central recess, a diaphragm in said recess, a division plate spanning said recess and having a widened outer face provided with one or more longitudinal grooves, the casing being provided with an inlet port and an outlet port located on opposite sides of said face, substantially as specified.

14. In a meter, the combination of a cylinder casing, a wabbling piston therein comprising a pair of members spaced to provide a recess therebetween, a diaphragm in said recess, a division plate spanning said recess and extending through a slot in said diaphragm, said division plate comprising a thin web having at the outer end thereof a wide flange and said casing being provided with an inlet and an outlet port located on opposite sides of said flange, substantially as specified.

15. In a meter, the combination of a spherical cylinder casing, a wabbling piston in said casing comprising an upper and a lower spherical sector member spaced apart to provide a zone-shaped recess therebetween, a spherical connecting member for the central portions of the former members, a diaphragm in and extending across said recess and having a central aperture fitting said connection, a vertical division plate spanning said recess and extending outwardly from the central connecting member, said division plate comprising a relatively thin web fitting a correspondingly narrow slot in said diaphragm and having at its outer end a widened face at substantially right angles to the body of the web, said face being provided with one or more longitudinal grooves therein and said casing having an inlet and an outlet port arranged on opposite sides of said face, substantially as specified.

16. In a meter, the combination of a spherical cylinder casing, a wabbling piston in said casing comprising an upper and a lower spherical sector member spaced apart to provide a zone-shaped recess therebetween, a spherical connecting member for the central portions of the former members, a diaphragm in and extending across said recess and having a central aperture fitting said connection, and a vertical division plate spanning said recess and extending outwardly from the central connecting member, said division plate comprising a relatively thin web fitting a correspondingly narrow slot in said diaphragm and having at its outer end a widened face at substantially right angles to the body of the web, said diaphragm having a slot for said widened face, the walls of said slot being rounded, and said casing having an inlet and an outlet port arranged on opposite sides of said face, substantially as specified.

17. In a meter, the combination of a piston comprising an upper and a lower member spaced apart to provide a recess therebetween, a central connecting member for the piston members and having its outer surface convex, a casing for said piston having an inlet and an outlet port, and a two-part diaphragm interposed between the piston members and having in each part a fractional aperture for the central connecting member, the wall of said aperture being curved to correspond to the curvature of the connecting member, substantially as specified.

18. In a meter, the combination of a cylinder casing, a wabbling piston therein having a central recess, a diaphragm in said recess, means for clamping the peripheral portion of said diaphragm, a division plate spanning said recess and having an outer face or flange, said flange being located within the peripheral portion of said diaphragm, and means for closing the space between the outer surface of said flange or face and the periphery of the diaphragm, substantially as specified.

19. In a meter, the combination of a cylinder casing, a wabbling piston therein having a central recess, a diaphragm in said recess, means for clamping the peripheral portion of said diaphragm, a division plate spanning said recess and having a wide outer face, said division plate extending through a slot in said diaphragm, and a filling piece interposed between the wide outer face of said division plate and the periphery of the diaphragm, said casing being provided with an inlet and an outlet port located on opposite sides of said outer face, substantially as specified.

20. In a meter, the combination of a cylinder casing comprising two sections provided with flanges, means for clamping said flanges together, a wabbling piston in said casing having a central recess, a diaphragm in said recess, the outer periphery of said diaphragm fitting a recess formed in the inner adjacent edge portions of the casing sections, a division plate spanning the recess in the piston and having an outer face, said division plate extending through a slot in said diaphragm, and a filling piece interposed between the outer face of said division plate and the periphery of the diaphragm and extending outwardly between the flanges of the casing sections, the cylinder casing being provided with an inlet and an outlet port located on opposite sides of the outer face of the division plate, substantially as specified.

In testimony whereof, I hereunto affix my signature in the presence of two witnesses.

OTTO F. KADOW.

Witnesses:
J. B. HULL,
BRENNAN B. WEST.